United States Patent [19]

Wallis

[11] Patent Number: 4,742,997
[45] Date of Patent: May 10, 1988

[54] GAS SPRING WITH SEPARATE CHARGING AND PRESSURE RELIEF VALVES

[76] Inventor: Bernard J. Wallis, 2215 Dacosta, Dearborn, Mich. 48128

[21] Appl. No.: 900,602

[22] Filed: Aug. 26, 1986

[51] Int. Cl.$^4$ .......................... F16F 9/02; F16F 7/00; F16K 15/00
[52] U.S. Cl. .................................. 267/119; 137/536; 137/538; 137/540; 267/64.28; 267/130
[58] Field of Search ...................... 188/322.14, 322.21; 267/113, 118, 119, 130, 64.28, 136, 137, 124, 75; 92/164, 163, 169, 143, 152; 91/268, 442; 137/536, 538, 540, 102

[56] References Cited

U.S. PATENT DOCUMENTS

| | | | |
|---|---|---|---|
| 3,250,526 | 5/1966 | Kress | 267/64.28 X |
| 4,056,965 | 11/1977 | Heiser | 267/119 X |
| 4,550,899 | 11/1985 | Holley | 267/119 |
| 4,662,616 | 5/1987 | Hennells | 267/64.28 |
| 4,664,362 | 5/1987 | Hennells | 267/119 |

Primary Examiner—Andres Kashnikow
Assistant Examiner—Robert J. Oberleitner
Attorney, Agent, or Firm—Barnes, Kisselle, Raisch, Choate, Whittemore & Hulbert

[57] ABSTRACT

For use in a system comprising a source of pressurized fluid and a plurality of lines extending to a plurality of gas springs, a gas spring comprising a cylindrical body with a bore, a piston rod positioned in the body and having an end projecting beyond one end of the body, a base closing the other end of the body, the cylindrical body and piston rod interengaging one another to limit relative outward movement of the piston rod with respect to the body. The gas spring includes a radial inlet through the wall of the cylindrical body into the base. A one-way valve is positioned in the base within the inlet and an axial inlet pressure passage extends from the outlet end of the valve to the interior of the cylinder. A radial bore is provided in the base and communicates at one end through an axial pressure relief passage to the interior of the cylinder. A pressure relief shuttle piston is positioned in the radial bore and a radial passage extends from the end of the shuttle piston remote from the axial pressure relief passage to the radial inlet of the cylindrical body. A spring yieldingly urges the pressure relief piston toward the axial pressure relief passage.

3 Claims, 2 Drawing Sheets

GAS SPRING WITH SEPARATE CHARGING AND PRESSURE RELIEF VALVES

This invention relates to gas spring systems which utilize a plurality of gas springs connected by a plurality of lines to a source of fluid under pressure.

BACKGROUND AND SUMMARY OF THE INVENTION

It has heretofore been suggested that in presses and the like, gas springs be utilized in lieu of metal springs for absorbing the loads encountered, for example in stamping. In such systems, a plurality of gas springs are connected by individual lines to a source of gas under pressure. It is desirable to be able to not only pressurize the cylinders to a common pressure but also replenish the gas that might be lost in use. In addition, it is desirable to be able to reduce the gas pressure in the cylinders. It has been suggested that complex charging and relief valves be provided in gas cylinders.

Among the objectives of the present invention are to provide a gas cylinder for use in a system having a plurality of such gas cylinders, each having a line extending to a pressurized source wherein gas pressure can be replenished or reduced, which is simple to construct, relatively low in cost, and can be easily maintained.

In accordance with the invention, a gas spring comprises a cylindrical body with a bore, a piston rod positioned in the body and having an end projecting beyond one end of the body, a base closing the other end of the body, the cylindrical body and piston rod interengaging one another to limit relative outward movement of the piston rod with respect to the body. The gas spring includes a radial inlet through the wall of the cylindrical body into the base. A one-way valve is positioned in the base within the inlet and an axial inlet pressure passage extends from the outlet end of the valve to the interior of the cylinder. A radial bore is provided in the base and communicates at one end through an axial pressure relief passage to the interior of the cylinder. A pressure relief shuttle piston is positioned in the radial bore and a radial passage extends from the end of the shuttle piston remote from the axial pressure relief passage to the radial inlet of the cylindrical body. A spring yieldingly urges the pressure relief piston toward the axial pressure relief passage.

DESCRIPTION

Figure 2:
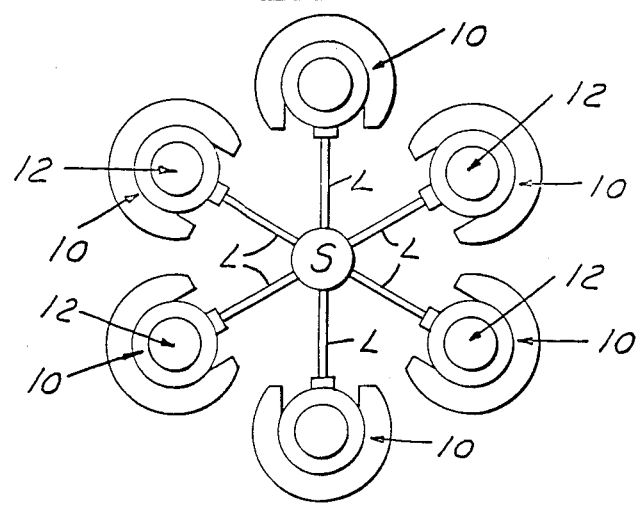
FIG. 2 is a partly diagrammatic view of a system embodying the invention.

Referring to FIG. 2, the gas cylinders 10 embodying the invention are adapted to be used in a system comprising a plurality of cylinders 10 each of which is connected by a line L to a source S of gaseous fluid under pressure which can be changed in the pressure as may be required for varyng loads.

Figure 1:
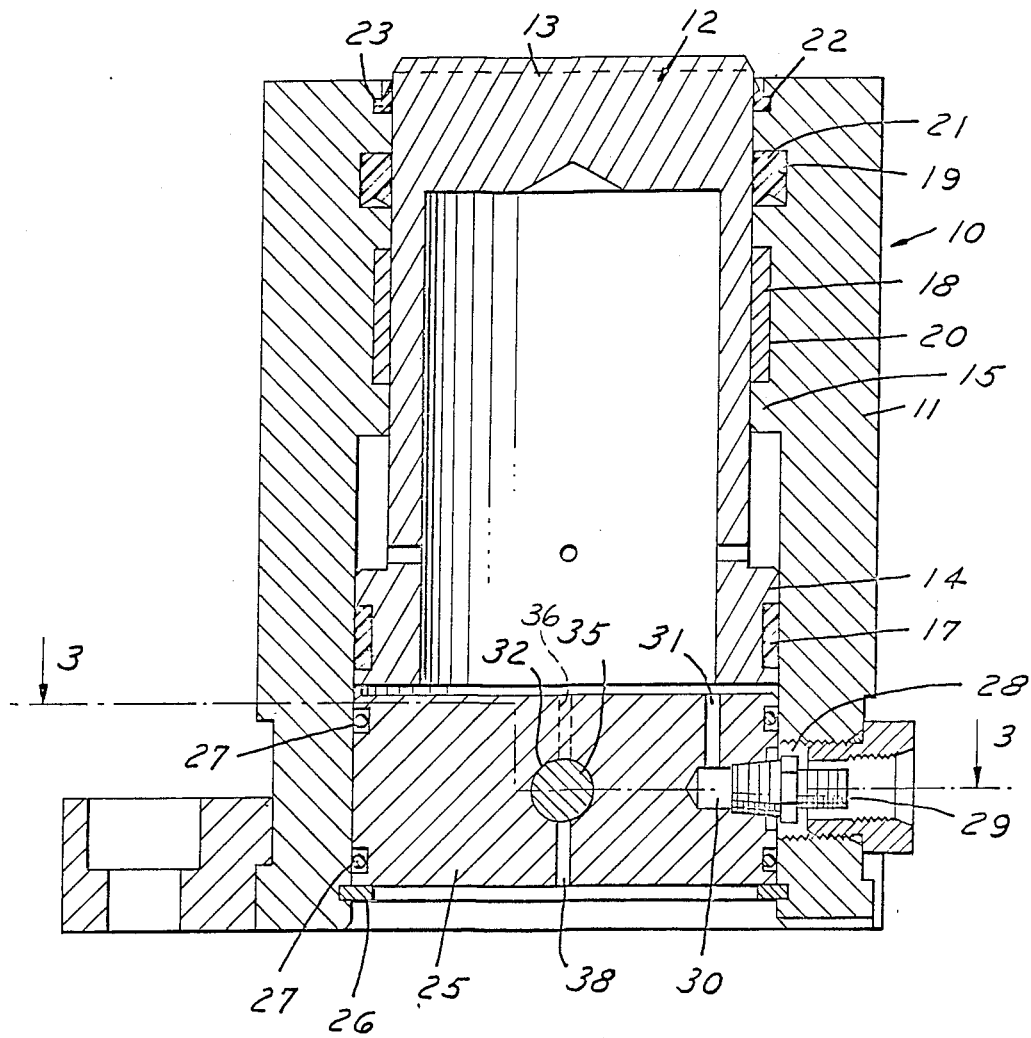
FIG. 1 is a vertical sectional view through a gas spring embodying the invention.
Figure 3:
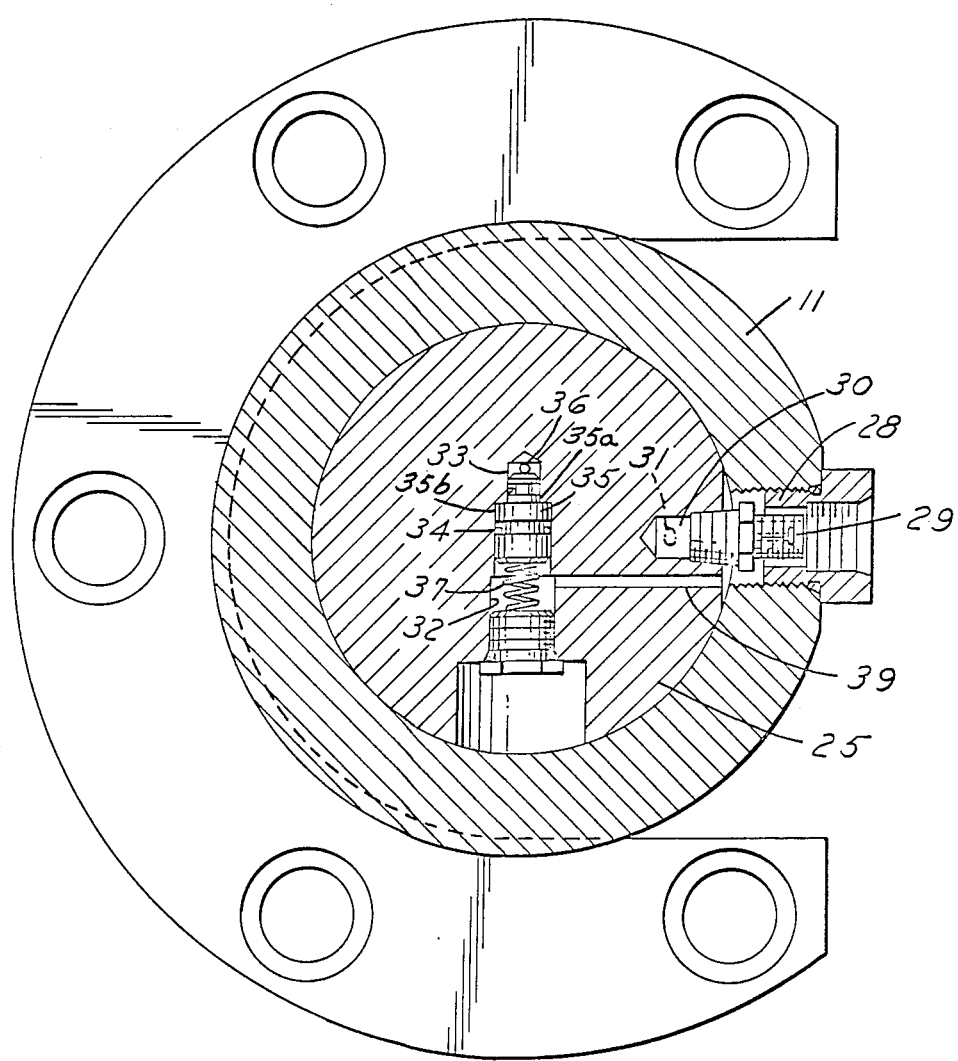
FIG. 3 is a sectional view taken along the line 3—3 in FIG. 1.

Referring to FIGS. 1 and 3, each gas cylinder 10 comprises a metal cylindrical body 11, a metal piston rod 12 having a closed end 13 and the radial flange 14 adapted to engage an internal radial flange 15 on the cylinder body 11 for limiting the axial outward movement of the piston rod 12. The piston rod includes an annular groove supporting a bearing 17 and the inner surface of the cylindrical body 11 includes annular grooves 18, 19 for supporting an annular bearing 20, and an annular seal 21. The cylinder body further includes an annular groove 22 supporting a wiper 23 that functions to help prevent dirt and oil from contaminating the sealing surfaces. A base 25 is provided in the lower end of the cylindrical body to close the lower end and is held in position by a snap ring 26. O-rings 27 in grooves in the plug provide a seal.

In accordance with the invention the wall of the cylindrical body 11 is provided with a radial gas inlet defined by a plug 28 and a one-way valve 29 is positioned in the inlet and threaded into the base 25. The inner end of the passage 30 into which the plug 28 is inserted is connected by an axial inlet passage 31 to the interior of the cylinder. As shown in FIG. 3, the base 25 is further formed with a radial bore 32 that has a portion 33 of reduced diameter as contrasted to a portion 34. A shuttle piston 35 having corresponding diameters 35a, 35b is positioned in the portions 33, 34. An axial pressure relief hole or passage 36 extends from the inner end of the passage 32 adjacent the portion of reduced diameter axially to the interior of the cylinder. A spring 37 yieldingly urges the piston toward the passage 36. In the position shown, the piston 35 closes a venting passage 38 that extends axially from the bore 32 to the exterior. Finally, a radial passage 39 extends from the opposite end of the passage 32 to the inlet 28.

In operation, the cylinder is charged with fluid applied to the inlet and through the one-way valve 29 and passage 31 to the interior of the cylinder. If for some reason the pressure in the gas spring exceeds a predetermined quantity the valve piston 35 shifts permitting fluid to pass through the pressure sensing passage 36 to the venting passage 38.

If the pressure in the gas spring is reduced, then the differential between the inlet pressure at 28 and the interior of the gas spring will permit the valve 29 to open introducing additional pressure.

In the event it is desired to reduce the pressure in the gas spring, the pressure in the inlet passage 28 is reduced. This is transmited through passage 29 to the bore 32 and being less than the load of the spring, the pressure in the cylinder through the sensing port 36 will cause the piston 35 to shift downwardly as viewed in FIG. 3 due to the differential pressure between the ends 35a, 35b of reduced diameter causing the pressure in the gas spring to be vented until the pressure reaches the desired lower value.

Figure 4:
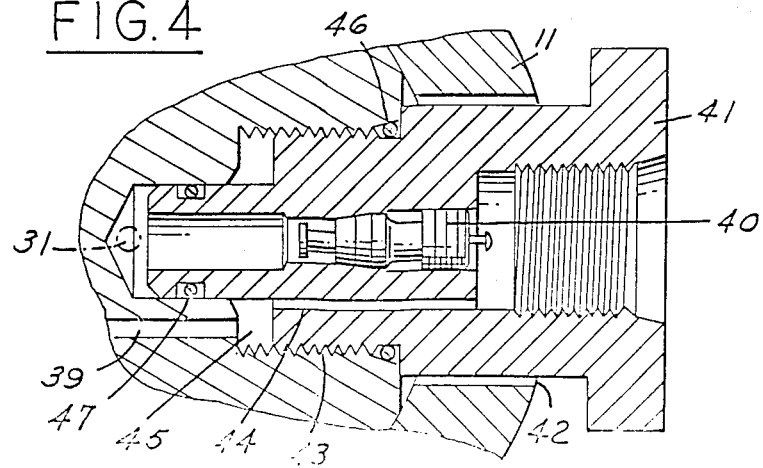
FIG. 4 is a fragmentary sectional view of a modified gas spring.

In the modified form of the invention shown in FIG. 4, the Schraeder type valve 40 is mounted on a plug 41 that extends through an opening 42 in wall 11 and is threaded into a radial opening in base 25. The inner end portion 43 of plug 41 has a reduced cross section. A passage 44 extends radially from the space 45 adjacent reduced portion 43. O-rings 46, 47 provide seals.

In can thus be seen that the present invention provides a gas cylinder for use in a system having a plurality of such gas cylinders each having a line extending to a pressurized source which is simple to construct, relatively low in cost and can be easily maintained.

I claim:

1. For use in a system comprising a source of pressurized fluid and a plurality of lines extending to a plurality of gas springs,
   a gas spring comprising a cylindrical body having a cylinder wall with an axial bore,
   a piston rod positioned in said axial bore of said body and having an end closing and projecting beyond one end of the body,
   a separate base closing the other end of the body,
   said cylindrical body and piston rod having interengaging portions for limiting relative outward movement of the piston rod with respect to the body,
   said gas spring including a radial inlet through the wall of the cylindrical body toward said base,
   said base having a first radial passage aligned with and communicating with said radial inlet in said wall,
   a one-way valve positioned in said radial passage of said base,
   an axial passage in said base extending from the radial passage in said base at the outlet end of said valve to the interior of the cylinder,
   a separate bore provided in the base and having closed ends,
   a pressure relief piston positioned in the bore,
   said separate bore having a first portion having a smaller diameter than a second portion,
   said pressure relief piston having a first portion sealingly engaging said first portion of said separate bore and a second portion sealingly engaging the second portion of said bore,
   a pressure relief passage in the base extending from the interior of the cylinder and intersecting said bore at said first portion of smaller diameter,
   a second passage in said base extending from the second portion of the bore remote from the pressure relief passage and communicating with the radial inlet of the wall of said cylindrical body such that the second portion of said piston is subjected to inlet pressure at all times,
   a vent passage in said base intersecting said bore and extending to the exterior of the cylinder,
   said first portion of said piston normally closing said vent passage and being operable when the pressure in the cylinder exceeds the inlet pressure by a predetermined value to open the vent passage to the exterior and being operable when the inlet pressure is reduced to open the vent passage to the exterior and thereby reduce the pressure in the cylinder to inlet pressure.

2. The gas spring set forth in claim 1 wherein said one-way valve is mounted onto said base, a plug mounted in said radial inlet in said wall of said cylinder and having a radial opening extending radially through said plug and communicating with said radial passage.

3. The gas spring set forth in claim 1 including a plug extending through the radial inlet of said cylinder wall mounted in said bore of said base and supporting said one-way valve, said plug having an inner reduced portion extending in a complementary opening in said base and having a radial passage extending through the end thereof adjacent said axial passage which extends from the one-way valve to the interior of said cylinder, and a third radial passage in said plug extending from adjacent said second radial passage to the area adjacent the inlet of the one-way valve.

* * * * *